(12) United States Patent
Colman et al.

(10) Patent No.: US 6,187,881 B1
(45) Date of Patent: Feb. 13, 2001

(54) PROCESS FOR POLYMERIZING OLEFINS

(75) Inventors: Derek Alan Colman, Fleet; Pascal Metzinger, Edinburgh, both of (GB); Bob Nater, Saint-Mitre-les-Remparts (FR)

(73) Assignee: BP Chemicals Limited, London (GB)

( * ) Notice: Under 35 U.S.C. 154(b), the term of this patent shall be extended for 0 days.

(21) Appl. No.: 09/198,504

(22) Filed: Nov. 24, 1998

Related U.S. Application Data

(63) Continuation of application No. PCT/GB97/01404, filed on May 22, 1997.

(30) Foreign Application Priority Data

May 24, 1996 (FR) .................................................. 96 06690
May 24, 1996 (FR) .................................................. 96 06691
May 24, 1996 (FR) .................................................. 96 06692

(51) Int. Cl.$^7$ ................................. C08F 10/00; C08F 2/00
(52) U.S. Cl. ................................. 526/87; 526/68; 526/78; 526/194; 526/185; 526/209; 526/237; 526/348.7
(58) Field of Search ...................... 526/68, 78, 87, 526/194, 209, 237, 185, 348.7

(56) References Cited

U.S. PATENT DOCUMENTS

| | | |
|---|---|---|
| 2,479,418 | 8/1949 | Schutze . |
| 2,529,318 | 11/1950 | Tegge . |
| 3,259,614 | 7/1966 | Pollock . |
| 3,962,200 * | 6/1976 | DeZarauz .......................... 526/194 X |
| 4,058,652 * | 11/1977 | Smith et al. ............................ 526/68 |
| 4,220,580 | 9/1980 | Rowatt . |
| 4,222,986 | 9/1980 | Smith et al. . |
| 4,400,493 * | 8/1983 | Abernathy, Jr. et al. ............... 526/68 |
| 5,087,678 * | 2/1992 | Noguki et al. ........................ 526/194 |
| 5,378,779 * | 1/1995 | Fauth et al. ...................... 526/237 X |

FOREIGN PATENT DOCUMENTS

| | | |
|---|---|---|
| 44 26 756 A1 | 2/1996 | (DE) . |
| 0 034 061 | 8/1981 | (EP) . |
| 1 244 418 | 9/1960 | (FR) . |
| 2 089 764 | 12/1971 | (FR) . |
| 2 340 957 | 9/1977 | (FR) . |
| 884 116 | 12/1961 | (GB) . |
| 2 134 121 | 8/1984 | (GB) . |
| WO 92 08743 | 5/1982 | (WO) . |

\* cited by examiner

*Primary Examiner*—Fred Teskin
(74) *Attorney, Agent, or Firm*—Nixon & Vanderhye

(57) ABSTRACT

Process for producing an olefin polymer of a low polydispersity index having low catalyst residues and low chlorine content, by polymerizing olefins in solution in the presence of a cationic catalyst, in a reactor containing a liquid phase comprising a liquid boiling hydrocarbon polymerization medium and having a vapor space above the liquid phase. The polymerization is carried out in the presence of a non-mechanical agent capable of suppressing foam formation during the polymerization.

22 Claims, 6 Drawing Sheets

PROCESS FOR POLYMERIZING OLEFINS

This is a continuation of PCT application No. PCT/GB97/01404, filed May 22, 1997.

The present invention relates to a process for the polymerization of olefin(s) which is particularly suitable for the manufacture of polybutene or polyisobutene.

BACKGROUND OF THE INVENTION

It is known to polymerize a mixture of butenes in solution in a boiling liquid hydrocarbon polymerization medium, especially for manufacturing a liquid polybutene or polyisobutene. In general the solution polymerization is carried out continuously in a reactor with the aid of a catalyst of cationic type and optionally of a cocatalyst. A reaction instability has very frequently been observed in the polymerization reactor in such a process. This instability can be characterized especially by the manufacture of a polymer of a nonuniform quality, which has a molecular weight distribution which is too broad, generally with catalyst residues or chlorine residues in a quantity which is too large. It may also be characterized by difficulties in control of some polymerization parameters, such as the polymerization temperature, the mean residence time of the polymer in the reactor or the withdrawal of the polymer out of the reactor.

SUMMARY OF THE INVENTION

After long studies it has surprisingly been found that these problems were linked with the presence of a foam which forms above the reaction liquid phase and which occupies a large proportion or even the whole of the reactor volume. This foam formation causes an instability of the reaction and a heterogeneity of the liquid hydrocarbon polymerization medium, which is reflected especially in a density gradient. These phenomena thus promote the production of a polybutene or polyisobutene of poor quality, which has in particular a breadth of the molecular weight distribution which is too broad and not compatible with some applications. Furthermore, the utilization of such a process is made difficult, for example, by loss of priming of the pumps which convey the liquid hydrocarbon polymerization medium, especially a loss of priming of the pump for withdrawing the polymer.

A process has now been found which allows the above-mentioned problems to be solved. In particular the process makes it possible to manufacture, in improved reaction stability conditions, a polybutene or polyisobutene of a stable and desired quality, which has in particular a narrow molecular weight distribution generally with a very low catalyst residue or chlorine content.

The process of the invention permits a stabilization of the polymerization reaction and hence better control of this reaction. Furthermore, taking into account the fact that the polymerization reaction is stabilized, the liquid hydrocarbon polymerization medium is more homogeneous. As a result, the mean residence time of the polymer in the polymerization reactor can be decreased. The process of the invention can thus permit an increase in the polymer production capacity of the reactor.

The present invention relates therefore to a process for producing an olefin polymer of a low polydispersity index (i.e. a narrow molecular weight distribution) having low catalyst residues and/or low chlorine content by the polymerization of olefin(s), especially $C_4$ olefin(s), said process being carried out in solution, in the presence of a cationic catalyst, in a reactor containing a liquid phase comprising a liquid boiling hydrocarbon polymerization medium and having a vapor space above said liquid phase, characterized in that the polymerization is carried out in the presence of a non-mechanical agent capable of suppressing foam formation during said polymerization.

The present invention also relates to a process for reducing the polydispersity index of an olefin polymer having low catalyst residues and/or low chlorine content in a solution polymerization of olefin(s), especially $C_4$ olefin(s), said process being carried out in the presence of a cationic catalyst in a reactor containing a liquid phase comprising a liquid boiling hydrocarbon polymerization medium and having a vapor space above said liquid phase, characterized in that the polymerization is carried out in the presence of a non-mechanical agent capable of suppressing foam formation during said polymerization.

More particularly the agent capable of suppressing foam in the present invention excludes the use of a mechanical means e.g. stirring for imparting shearing forces to foam accumulating in the vapor space of the reactor.

According to a first embodiment of the present invention, the agent capable of suppressing foam formation preferably is a liquid hydrocarbon spray introduced into the vapor space above the liquid phase in the reactor.

BRIEF DESCRIPTION OF THE DRAWINGS

The invention will now be described in more detail with reference to the accompany drawings, in which.

According to a second embodiment of the present invention, the agent capable of suppressing foam formation is a fresh olefin liquid feed introduced into the reactor at a temperature lower than that of the liquid phase comprising the liquid boiling hydrocarbon polymerization medium.

Figure 5:
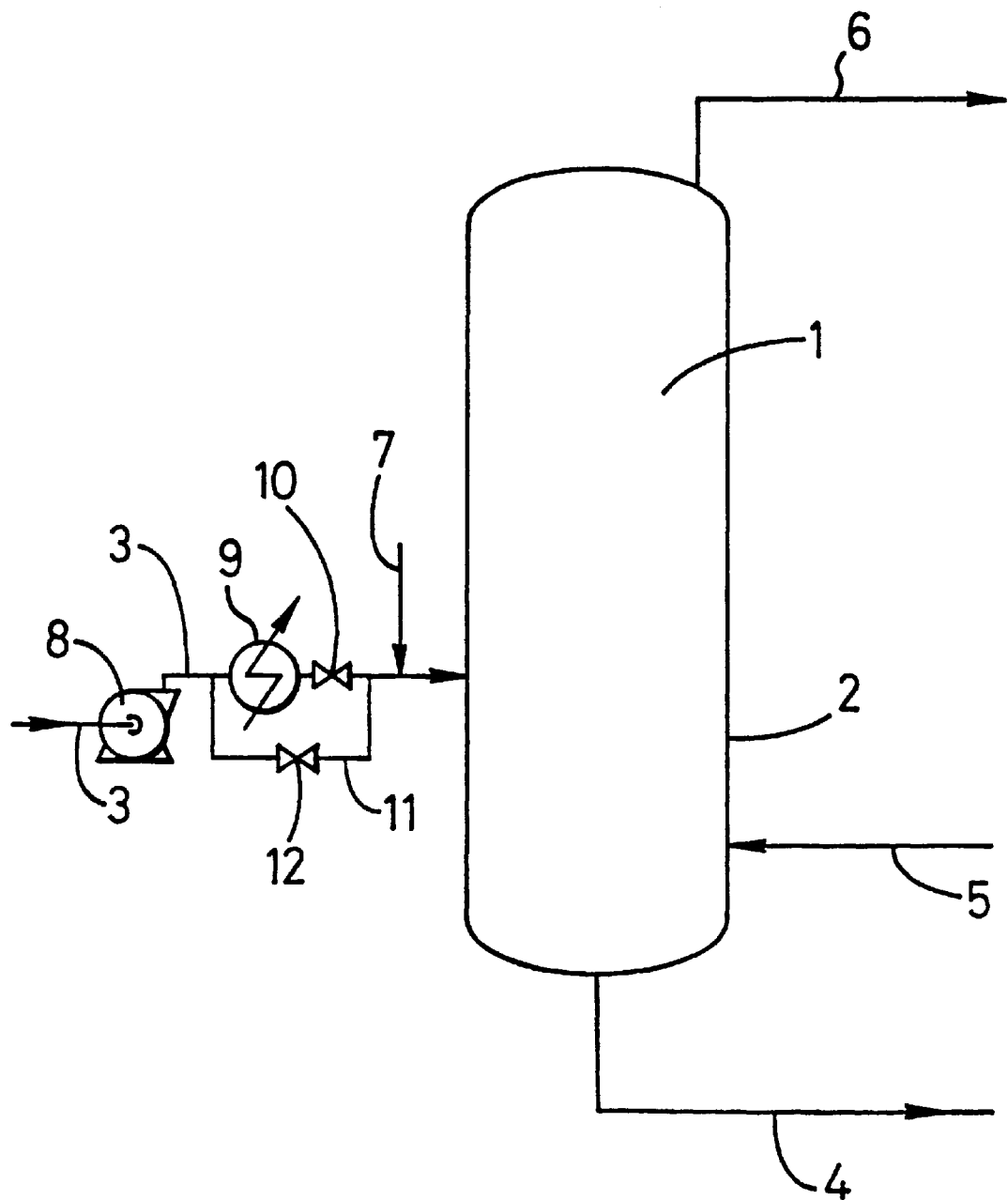

FIG. 5 shows diagrammatically a device for implementing the process of the invention using a fresh olefin liquid feed at a temperature lower than that of the liquid phase.

According to a third embodiment of the present invention, the agent capable of suppressing foam formation is a chemical foam-suppressor.

Figure 6:
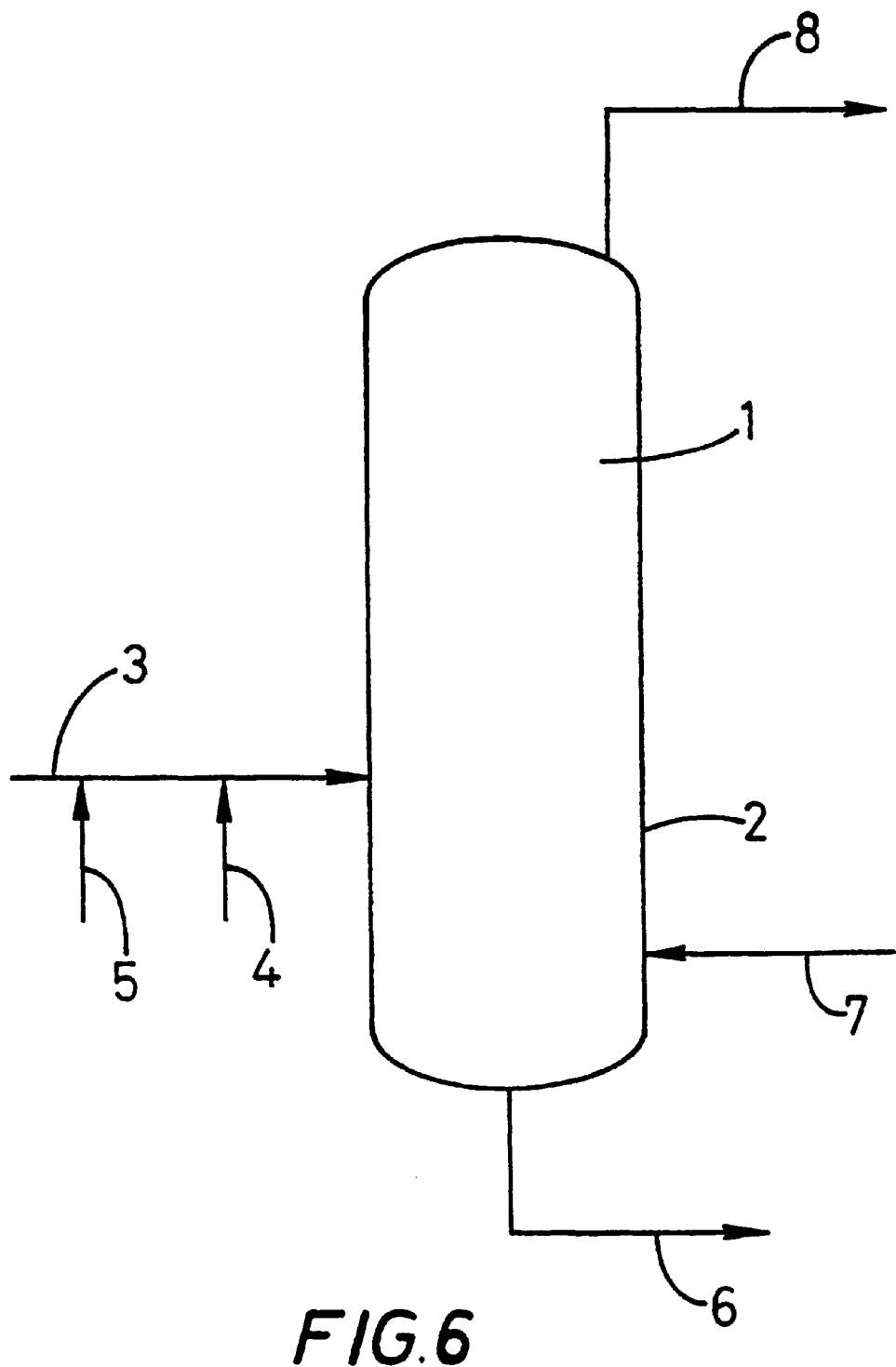

FIG. 6 shows diagrammatically a device for implementing the process of the invention using a chemical foam-suppressor.

DETAILED DESCRIPTION OF THE INVENTION

The present invention preferably relates to a process for producing an olefin polymer of a low polydispersity index (i.e. a narrow molecular weight distribution) having low catalyst residues and/or low chlorine content by the polymerization of olefin(s), especially $C_4$ olefin(s), said process being carried out in solution, in the presence of a cationic catalyst, in a reactor containing a liquid phase comprising a liquid boiling hydrocarbon polymerization medium and having a vapor space above said liquid phase, characterized in that the polymerization is carried out in the presence of an agent selected from (a) a liquid hydrocarbon spray introduced into the vapor space above the liquid phase in the reactor, (b) a fresh olefin liquid feed introduced into the reactor at a temperature lower than that of said liquid phase, and (c) a chemical foam-suppressor.

Preferably the present invention also relates to a process for reducing the polydispersity index of an olefin polymer having low catalyst residues and/or low chlorine content in a solution polymerization of olefin(s), especially $C_4$ olefin(s), said process being carried out in the presence of a cationic catalyst in a reactor containing a liquid phase comprising a liquid boiling hydrocarbon polymerization medium and having a vapor space above said liquid phase, characterized in that the polymerization is carried out in the presence of an agent selected from (a) a liquid hydrocarbon spray introduced into the vapor space above the liquid phase in the reactor, (b) a fresh olefin liquid feed introduced into the reactor at a temperature lower than that of said liquid phase, and (c) a chemical foam suppressor.

In the first embodiment, the present invention relates therefore to a process for a solution polymerization of olefin(s), especially $C_4$ olefin(s), carried out in the presence of cationic catalyst, in a reactor containing a liquid phase comprising a boiling liquid hydrocarbon polymerization medium and having a vapor space above said liquid phase, characterized in that the polymerization is carried out in the presence of a liquid hydrocarbon spray introduced into the vapor space above the liquid phase in the reactor.

According to one particular aspect, the invention also relates to a process for narrowing down the molecular weight distribution of a polyolefin obtained by continuous polymerization of olefin(s), especially $C_4$ olefin(s), carried out in solution, in a reactor containing a liquid phase comprising a boiling liquid hydrocarbon polymerization medium and having a vapor space above said liquid phase in the presence of a cationic catalyst, characterized in that the polymerization is carried out in the presence a liquid hydrocarbon spray introduced into the vapor space of the reactor, preferably continuously.

According to the invention, at least one liquid hydrocarbon spray is introduced into the vapor space of the reactor. As a result, any phenomenon of foaming of the liquid phase can thus be avoided or stopped and the polymerization solution can be conducted in stable conditions and a polymer of a uniform and even improved quality can be manufactured. The detection of possible foaming can be performed with the aid of a series of pressure sensors, for example by measuring the pressure difference between the top and the bottom of the reactor, or by measurements of absorption of a gamma radiation which are performed at different heights of the reactor.

The liquid hydrocarbon spray is not introduced directly into the liquid phase, but into the vapor space of the reactor, preferably continuously and especially at one or more points situated above the surface of the liquid phase which separates the vapor space from said liquid phase. Its introduction can take place at the side or preferably through the top of the polymerization reactor, especially vertically above the liquid phase. By way of example, the reactor shown diagrammatically in FIG. 1 can be employed for implementing the invention.

The temperature of the liquid hydrocarbon spray can be advantageously chosen so as to avoid the immediate evaporation of the sprayed liquid when it is introduced into the vapor space of the reactor. To do this, the temperature of the liquid hydrocarbon spray may be preferably lower than that of the liquid phase comprising the liquid boiling hydrocarbon polymerization medium. In most cases it is from 2 to 30° C., preferably from 3 to 15° C., lower than that of the liquid phase comprising the liquid boiling hydrocarbon polymerization medium. In some cases it may also be equal to or higher than the temperature of the liquid phase, but on condition that the liquid hydrocarbon spray does not evaporate inside the spraying device, for example inside nozzles intended to spray the liquid hydrocarbon. In this case it may be from 2 to 30° C., preferably from 3 to 10° C., higher than that of the liquid phase comprising the liquid boiling hydrocarbon polymerization medium.

The liquid hydrocarbon spray is introduced into the reactor preferably in a pulverized form, in particular in the form of droplets. These droplets are intended to fall essentially under gravity through the vapor space into the liquid phase in order to avoid or to inhibit or prevent any foaming phenomenon of the liquid phase comprising the liquid boiling hydrocarbon polymerization medium. As a result, the droplets may have a dimension which is sufficient to avoid entrainment of the droplets towards the top of the reactor, especially with a gas which can escape through the top of the reactor. These droplets advantageously have a mean diameter of between 100 and 2 000 $\mu$m, preferably between 500 and 1 500 $\mu$m.

According to the invention the liquid hydrocarbon spray is preferably dispersed uniformly above the liquid phase comprising the liquid hydrocarbon polymerization medium while being directed downwards, that is to say towards the liquid phase. The liquid hydrocarbon spray is advantageously introduced with the aid of a spraying device, especially a device having one or more nozzles the purpose of which is to finely spray and uniformly disperse the liquid hydrocarbon above the liquid phase. The nozzles are preferably arranged uniformly in the upper part of the reactor which has the vapor space and point vertically downwards. In particular, they may be uniformly arranged horizontally on one or more crown rings or so as to form a gridwork or a system on one or more levels. It is particularly advantageous to obtain droplets which have a sufficient falling velocity to effectively reduce the foaming phenomenon. Thus, the introduction of the liquid hydrocarbon spray into the vapor space is advantageously performed at least 1 m, preferably at least 1.5 m above the surface of the liquid phase which separates the vapor space from said liquid phase. In practice the distance between the spraying device, especially the nozzles and the surface of the liquid phase is advantageously equal to or greater than 1 m and in most cases between 1 and 4 m, especially between 1.5 and 3 m.

The number of nozzles is a function of the size of the reactor and of the dimensions of the nozzles which determine the flow rate of the liquid hydrocarbon spray. The number of nozzles employed is suitably between 1 and 100, preferably between 3 and 10. A nozzle generally ends in a fine-spraying orifice which has a diameter that can range from 4 to 50 mm, preferably from 5 to 20 mm.

According to the invention the liquid hydrocarbon spray may be a single hydrocarbon or a mixture of liquid hydrocarbons containing, for example, from 3 to 25 carbon atoms. The liquid hydrocarbon spray may comprise at least one of the reactant hydrocarbons, especially at least one olefin, for example $C_4$ olefin, which takes part in the polymerization reaction, e.g. a butene, isobutene or another olefin. It may also comprise at least one inert hydrocarbon such as a linear, cyclic or branched alkane containing, for example, from 3 to 12, preferably from 4 to 6, carbon atoms, e.g. a butane, a pentane, a hexane or cyclohexane. The liquid hydrocarbon spray may be a light olefin polymer, especially a $C_4$ olefin(s) polymer, in particular an oligomer or a mixture of light polymers. The light polymer may be a fraction of the polymer manufactured by the polymerization reaction itself and optionally separated by distillation from the liquid phase. It may have a number-average molecular weight of between 100 and 300. The liquid hydrocarbon spray may be a mixture of two or more of the abovementioned hydrocarbons, which are chosen especially from reactive hydrocarbons such as olefins, especially $C_4$ olefins, inert hydrocarbons such as alkanes, especially from $C_3$ to $C_{12}$, and polymers or oligomers, especially of $C_4$ olefin(s). In particular, it may be identical in nature to the liquid phase comprising the liquid hydrocarbon spray polymerization medium and the polymer manufactured and withdrawn from the reactor and a fraction of which may be employed as the liquid hydrocarbon spray. The liquid hydrocarbon may be preferably a fraction or all of the fresh olefin(s) liquid feed to the reactor, as described later. It may also be a fraction or all of a liquid obtained by cooling and condensing a condensable gas escaping from the vapor space of the reactor.

The liquid hydrocarbon spray is advantageously introduced into the reactor at an hourly flow rate which is a function of the surface of the liquid phase to be sprayed in the reactor. The surface to be sprayed corresponds generally to the internal area of the cross-section of the reactor at the upper level, where the liquid phase arrives. More particularly, the flow rate of the liquid hydrocarbon spray may correspond, per hour and per square meter of the surface of the liquid phase, to a volume ranging from 0.3 to 3, preferably from 0.4 to 2 and more especially from 0.6 to 1.2 $m^3$. Furthermore, this flow rate may also be equivalent to a proportion or to all of the flow rate of the fresh olefin(s) liquid feed to the reactor. It may advantageously represent from 5 to 80%, preferably from 10 to 60% and more particularly 15 to 40%, of the flow rate of the fresh olefin(s) liquid feed to the reactor.

The polymerization reaction may be performed batchwise or preferably continuously. The polymerization temperature is in general between −30° C. and +50° C., preferably between −20° C. and +25° C. The absolute pressure in the reactor is a function of the polymerization temperature and can range from 0.03 to 1, preferably from 0.05 to 0.5 MPa.

The boiling liquid hydrocarbon polymerization medium suitably contains the olefin or the olefins, especially $C_4$ olefins, to be polymerized, polymer being formed, catalyst and optionally cocatalyst and saturated hydrocarbons such as alkanes or cycloalkanes.

A fresh olefin(s) liquid feed containing the olefin(s) to be polymerized is introduced into the reactor. In most cases the olefin to be polymerized is at least one $C_4$ olefin, that is to say a butene, especially isobutene. The feed in general consists of a mixture of $C_4$ olefins, that is to say a mixture of butenes. Such a mixture may include, by weight, from 1 to 40%, preferably from 3 to 30% of 1-butene, from 5 to 20%, preferably from 10 to 15% of cis 2-butene, from 5 to 40%, preferably from 10 to 30% of trans 2-butene and from 15 to 60%, preferably from 20 to 50% of isobutene. Furthermore, the fresh olefin(s) liquid feed may additionally contain one or more alkanes or cycloalkanes such as eg the butanes. Thus, for example, the fresh olefin(s) liquid feed may contain from 60 to 95% by weight of a mixture of butenes and/or isobutene such as those described above, and from 5 to 40% of $C_4$ alkanes.

Figure 2:
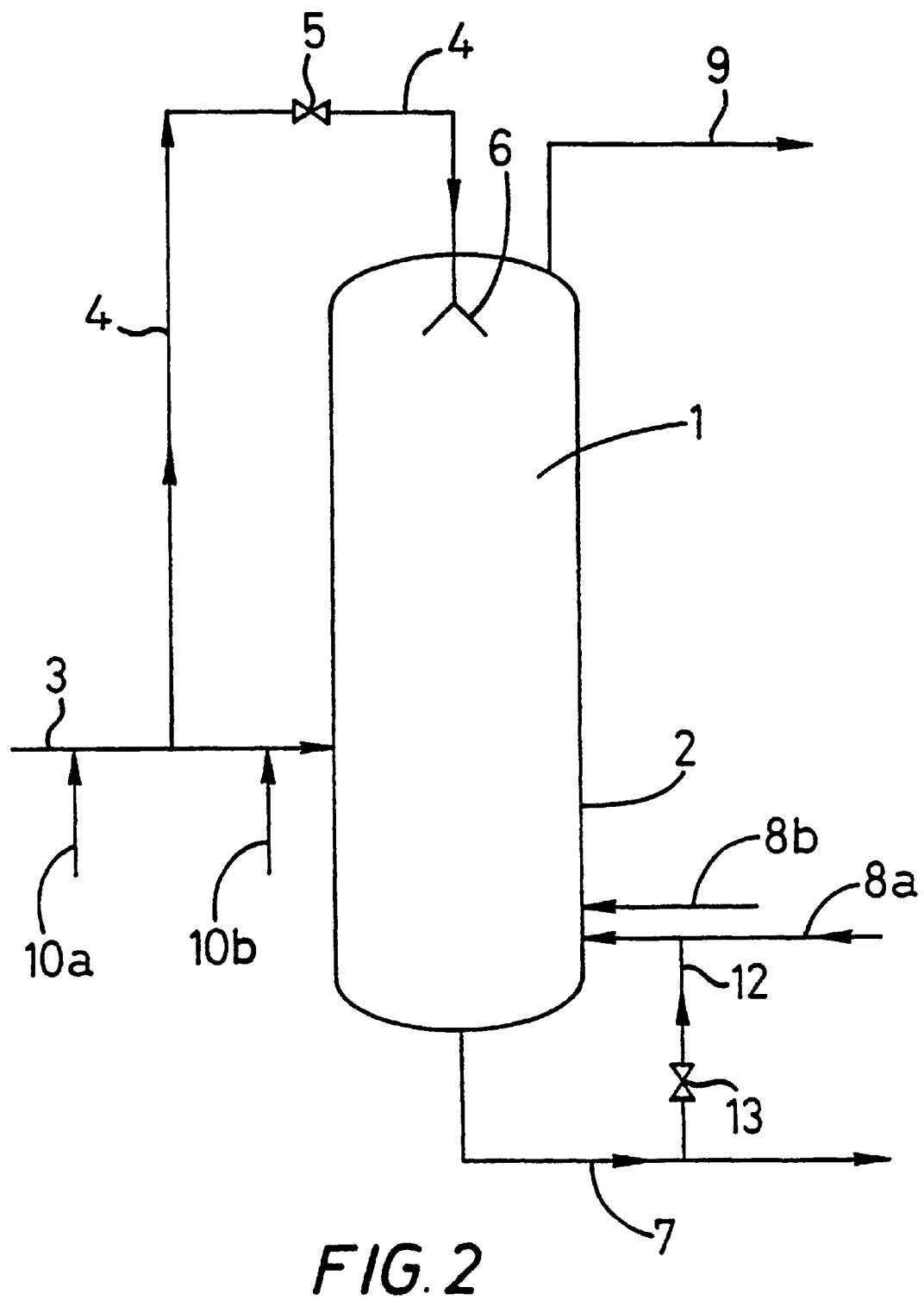

The fresh olefin(s) liquid feed may be introduced directly into the liquid phase. It may also be introduced into the liquid phase as an admixture with any other liquid introduced into the reactor, for example with a liquid obtained by cooling and condensing condensable gas escaping from the vapor space of the reactor and returned into the reactor. The fresh olefin(s) liquid feed may also be introduced wholly into the vapor space as liquid hydrocarbon spray. A portion of the fresh olefin(s) liquid feed may be advantageously introduced into the liquid phase and another portion into the vapor space as liquid hydrocarbon spray. To do this, it is possible to employ the device shown diagrammatically in FIG. 2. The fresh olefin(s) liquid feed employed partially or wholly as liquid hydrocarbon spray may be introduced into the vapor space at the side or through the top of the reactor, by opening the stopcock (5) of the conduit (4) as shown in FIG. 2.

Consequently, the liquid hydrocarbon spray may have a composition that is identical with the fresh olefin(s) liquid feed. It may consist of a portion or of all of the fresh olefin(s) liquid feed and may be introduced preferably continuously into the vapor space of the reactor, particularly when a continuous polymerization is carried out.

The fresh olefin(s) liquid feed may be preferably at a temperature that is lower than or equal to that of the liquid phase comprising the liquid boiling hydrocarbon polymerization medium.

The liquid phase may be agitated by any known means, especially with the aid of a stirrer.

The agitation of the liquid phase may also be produced by forced circulation of said liquid phase, which may include the withdrawing and the reintroduction of a portion of the liquid phase, especially with the aid of a so-called recycle pump. In this case the liquid hydrocarbon spray may be a portion of the liquid phase withdrawn from the reactor and returned to said reactor, preferably continuously, into the vapor space, optionally after cooling. The device shown diagrammatically in FIG. 3 may be employed to carry out this operation.

The vapor space of the reactor may comprise a gas phase that is, in particular, condensable. As a result, a condensable gas can escape from the vapor space of the reactor. In general this gas is condensed outside the reactor, in particular in order to remove the heat of the polymerization reaction according to an auto refrigerating system. After cooling and condensation of this gas as a liquid, it can be recovered and recycled into the vapor space and/or into the liquid, phase. A portion or all of the fresh olefin(s) liquid feed may be added to this liquid. The liquid thus condensed and recycled is preferably introduced into the vapor space as a liquid hydrocarbon spray and, in particular, continuously, when a continuous polymerization is carried out.

Consequently, according to an alternative form of the invention, the liquid hydrocarbon spray may consist of all or of a portion of a liquid obtained after cooling and condensation of a condensable gas which escapes from the vapor space of the reactor and returned to said reactor. By way of example, this alternative form of the invention may be carried out with the aid of the device shown diagrammatically in FIG. 4.

To carry out the polymerization of the olefin, a catalyst which is suited to a cationic polymerization of olefins, including a cationic catalyst and optionally a cocatalyst, is employed. More particularly, the catalyst may be a halogen-containing compound of boron e.g. boron trifluoride or an organoluminium compound, for example of formula $AlR_nX_{n-3}$ in which R is an alkyl radical containing, for example, from 1 to 10 carbon atoms, X is chlorine or bromine and n is a whole number or fraction ranging from 0 to 3. The cocatalyst may be hydrochloride acid, an alkyl halide e.g. tert-butyl chloride, water or an alcohol such as ethanol, in particular when born trifluoride is employed as catalyst, in particular with the catalyst system of formula $BF_3$, $C_2H_5OH$.

The polymerization reaction may be performed with the aid of an alkyl halide as cocatalyst according to the process described in the prior published European Patent Application EP-A-0 645 402, especially with the catalyst system including ethyldichloroaluminium and tert-butyl chloride.

The molar ratio of the cocatalyst to the catalyst is advantageously between 0.05 and 20, preferably between 1 and 10.

The catalyst and the cocatalyst are preferably introduced into the reactor separately. One of the components of the catalyst system may be introduced in the fresh olefin(s) liquid feed or in the liquid hydrocarbon spray. A portion or all of the cocatalyst or of the catalyst may be introduced into the reactor as a mixture with another liquid hydrocarbon, in particular with a polymer present, for example, in a portion of the liquid phase comprising the liquid hydrocarbon polymerization medium, which is withdrawn and recycled in order to provide agitation of the liquid phase of the reactor.

The process of the invention is particularly suitable for the manufacture of liquid polybutenes or polyisobutenes. These polybutenes or polyisobutenes may have a viscosity at 100° C. ranging from 20 to 50 000 centiStokes (cSt), preferably from 30 to 5 000 cSt, and a number-average molecular weight ranging from 150 to 11 000, preferably from 500 to 5 500 dalton. They may contain from 3 to 200, preferably from 10 to 100 units derived from a butene monomer. They contain approximately 1 unsaturation per mole and in particular from 0.02 to 0.95 unsaturation of vinylidene type and from 0.05 to 0.98 unsaturation of other types. When the number-average molecular weight is from 500 to 5 500 dalton, the breadth of the molecular mass distribution may range from 1.2 to 2.5, preferably from 1.4 to 2 and especially from 1.5 to 1.7. Furthermore, it preferably contains less than 50 parts by weight per million (ppm) of halogen such as chlorine.

Figure 1:
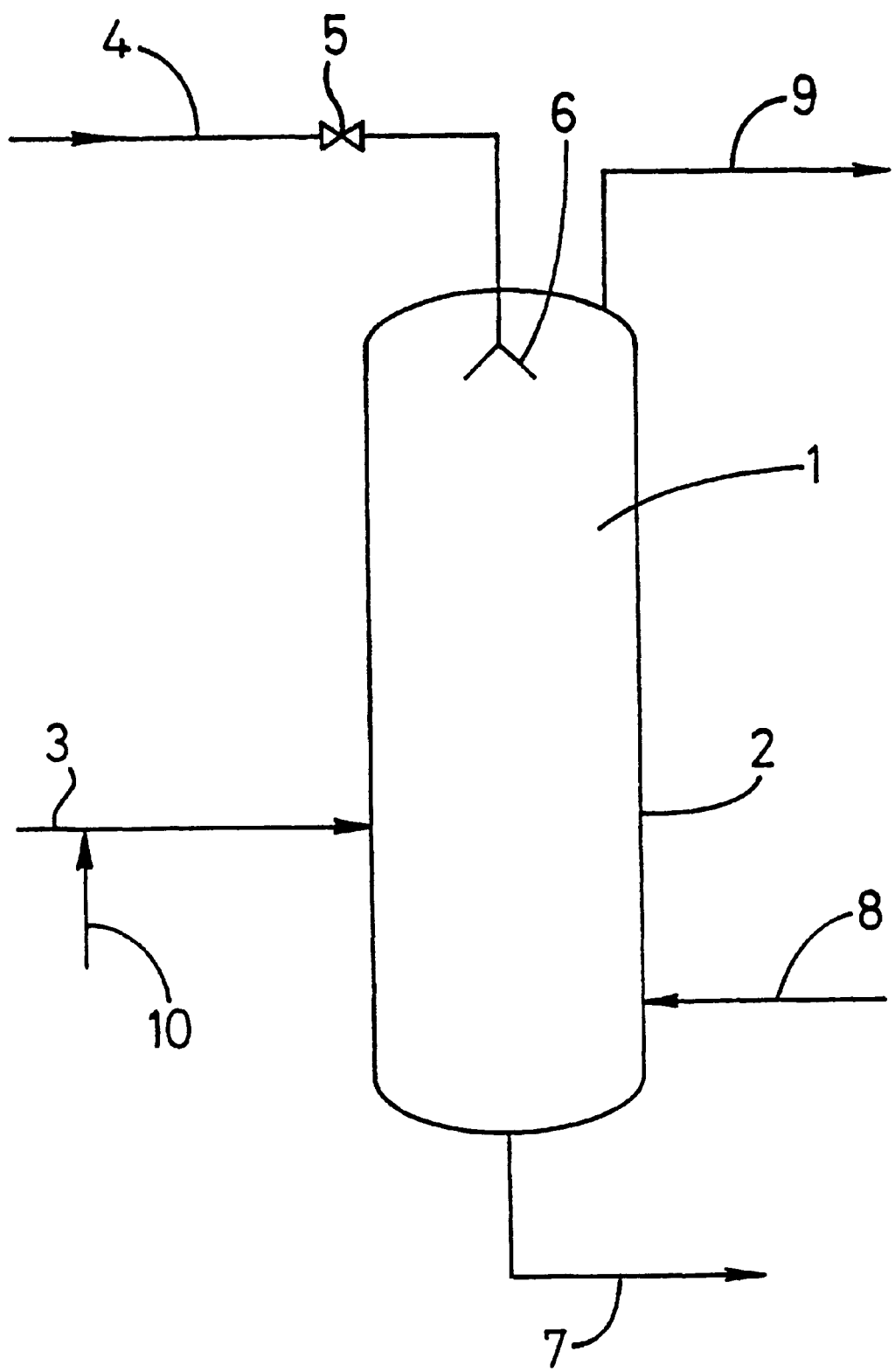
FIGS. 1 to 4 show diagrammatically various devices for implementing the process of the invention using a liquid hydrocarbon spray.

FIG. 1 shows diagrammatically a solution polymerization device with a reactor (1) which essentially comprises a cylindrical part (2). The reactor is equipped with a fresh olefin(s) liquid feed conduit (3) which leads into the cylindrical part (2) containing the liquid phase comprising the liquid boiling hydrocarbon polymerization medium, and with a conduit for introducing liquid hydrocarbon spray (4), which leads into the vapor space of the reactor. The conduit for introducing liquid hydrocarbon spray (4) is equipped with a valve (5) and ends in a system for spraying or fine spraying (6) including in particular one or more nozzles. The reactor is also equipped with a conduit (7) for withdrawing the liquid phase containing the manufactured polymer, with a catalyst feed conduit (8) and with a condensable gas exit conduit (9). A conduit for introducing cocatalyst (10) leads into the fresh olefin(s) liquid feed conduit (3).

FIG. 2 shows diagrammatically a solution polymerization device with which it is possible to employ at least a portion of the fresh olefin(s) liquid feed as liquid hydrocarbon spray. This device is identical with that in FIG. 1, except for the fact that the conduit for introducing liquid hydrocarbon spray (4) connects the fresh olefin(s) liquid feed conduit (3) to the spraying or pulverizing system (6). Furthermore, two conduits for introducing cocatalyst (10a) and (10b) lead into the conduit (3). A portion of the liquid phase withdrawn through the conduit (7) is recycled by a conduit (12) fitted with a stopcock (13), into the liquid phase of the reactor in order to provide agitation. Catalyst feed conduits (8a) and (8b) lead into the conduit (12) and into the cylindrical part (2) of the reactor.

Figure 3:
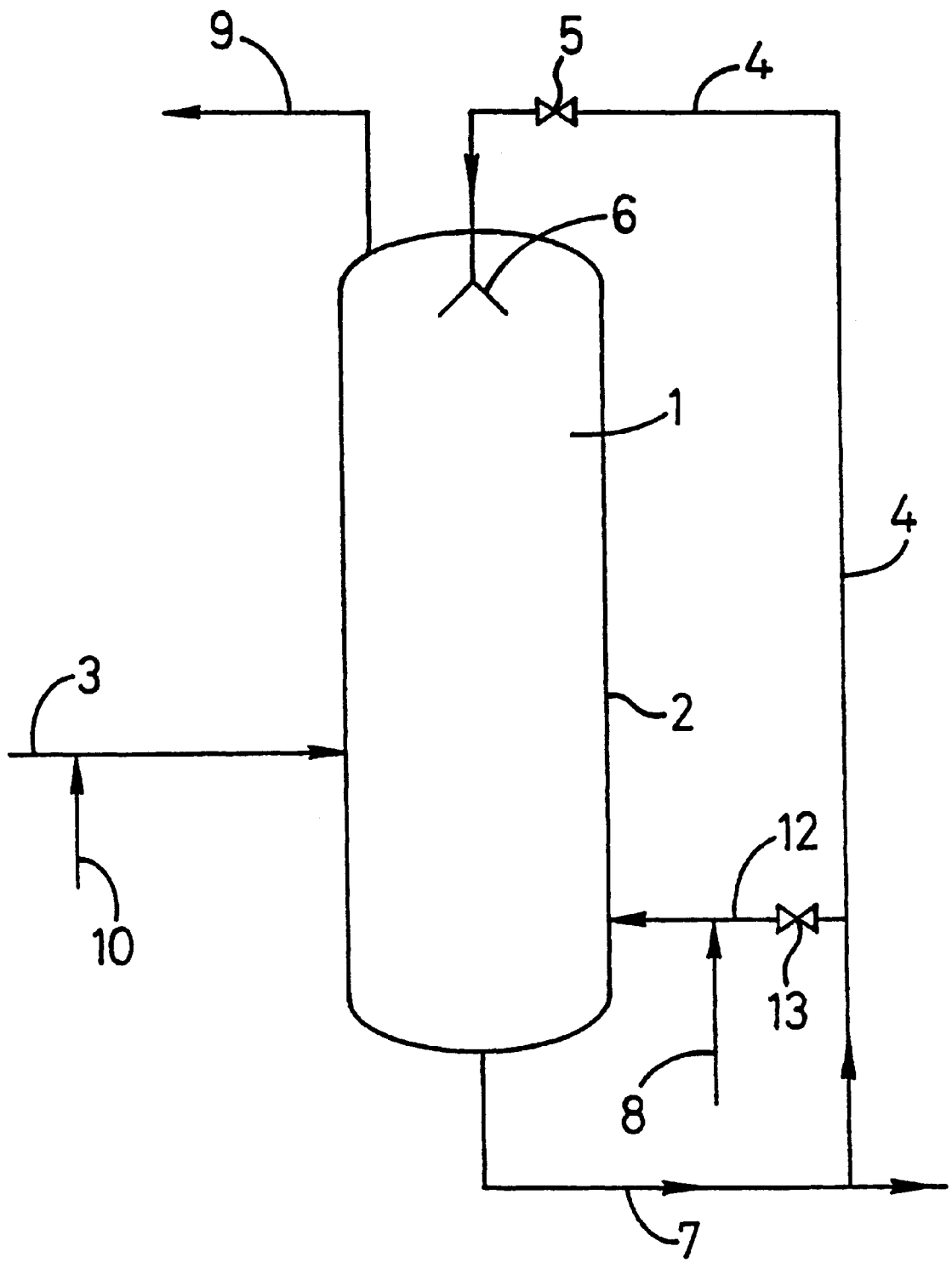

FIG. 3 shows diagrammatically a solution polymerization device with which it is possible to employ a portion of the liquid phase containing the manufactured polymer, which is withdrawn from the reactor and reintroduced as liquid hydrocarbon spray. This device is identical with that in FIG. 1, except for the fact that the conduit for introducing liquid hydrocarbon spray (4) connects the conduit for withdrawing (7) to the spraying or pulverizing system (6) and that a portion of the liquid phase withdrawn through the conduit (7) is recycled through a conduit (12) fitted with a stopcock (13) into the liquid phase of the reactor to provide agitation, the catalyst feed conduit (8) leading into the conduit (12).

Figure 4:
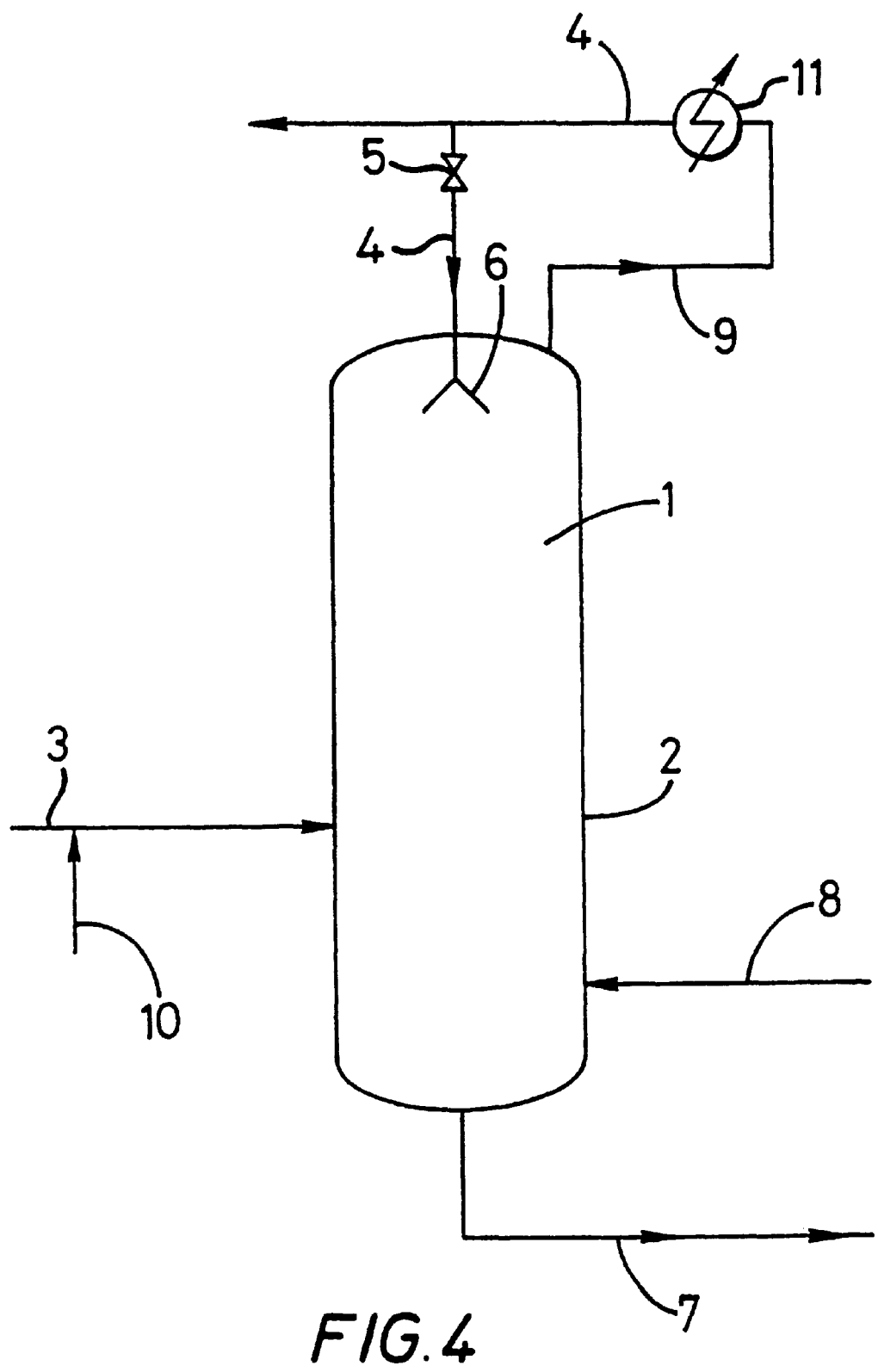

FIG. 4 shows diagrammatically a solution polymerization device with which it is possible to employ a liquid obtained after cooling and condensation of a condensable gas which escapes from the vapor space of the reactor and which is recycled as a liquid hydrocarbon spray. This device is identical with that described in respect of FIG. 1, except for the fact that the conduit for introducing liquid hydrocarbon spray (4) connects the condensable gas exit conduit (9) to the spraying or pulverizing system (6) and that the condensable gas exit conduit is fitted with a cooling and condensing system (11) intended to cool and condense the condensable gas escaping from the vapor space of the reactor.

A process for continuous polymerization of olefin(s), especially $C_4$ olefin(s), is preferably carried out, which means that the fresh olefin(s) liquid feed, as well as the liquid hydrocarbon spray and the catalyst and optionally the cocatalyst are continuously introduced into the reactor and the liquid phase containing the manufactured polymer is withdrawn continuously from the reactor. A portion of the liquid phase withdrawn from the reactor and containing the manufactured polymer may be advantageously continuously recycled directly into the liquid phase of the reactor to provide agitation, and/or preferably into the vapor space of the reactor as liquid hydrocarbon spray. Furthermore, the condensable gas escaping from the vapor space of the reactor may be advantageously recycled at least partly and continuously after cooling and condensation, as liquid hydrocarbon spray into the vapor space of the reactor.

It follows from this that the process is very particularly suitable for reducing or stopping the foaming phenomena in a continuous solution polymerization of olefin(s), in particular $C_4$ olefins, and that the liquid hydrocarbon spray is introduced continuously into the gas phase of the reactor.

In a second embodiment, the present invention also relates to a process for the polymerization of olefin(s), for example $C_4$ olefin(s), carried out in solution, in the presence of a cationic catalyst, in a reactor containing a liquid phase comprising a boiling liquid hydrocarbon polymerization medium and a vapor space above said liquid phase, characterized in that the polymerization is carried out in the presence of a fresh olefin(s) liquid feed introduced into the reactor at a temperature lower than that of the liquid phase. Preferably a continuous polymerization is carried out and the fresh olefin(s) liquid feed is continuously introduced into the vector.

According to one particular aspect, the invention also relates to a process for narrowing down the molecular weight distribution of a polyolefin obtained by the polymerization of olefin(s), especially $C_4$ olefin(s), carried out in solution, in a reactor containing a liquid phase comprising a boiling liquid hydrocarbon polymerization medium and a vapor space above said liquid phase in the presence of a cationic catalyst, characterized in that a fresh olefin(s) liquid feed at a temperature lower than that of the liquid phase is introduced into the reactor. Preferably the polymerization process is carried out continuously and the fresh olefin(s) liquid feed is continuously introduced into the reactor.

According to one aspect of the invention, a fresh olefin(s) liquid feed which has a temperature lower than that of the liquid phase, is introduced into the reactor in order to avoid or to stop any foaming phenomenon in the liquid phase and thus to make it possible to conduct a solution polymerization in stable conditions and to manufacture a polymer of a uniform, and even improved, quality, with a narrow molecular weight distribution.

The temperature of the fresh olefin(s) liquid feed is in most cases from 2 to 30° C., preferably from 3 to 15° C., lower than that of the liquid phase. A heat exchanger is generally employed, intended to cool the fresh olefin(s) liquid feed and to bring it to the desired temperature.

Under these circumstances, the polymerization temperature, that is to say the temperature of the liquid phase is, in general, between −30° C. and +50° C., preferably between −20° C. and +25° C. The temperature may thus be negative and be, for example, between −30° C. and 0° C. However, it is preferably positive and advantageously higher than 0° C. and lower than +50° C., and preferably higher than 0° C. and lower than +25° C.

As previously mentioned, the fresh olefin(s) liquid feed contains the olefin(s) to be polymerized. In these conditions the fresh olefin(s), in particular $C_4$ olefin(s), liquid feed may be introduced into the reactor with the aid of a pump and of a control system without resulting in a partial evaporation in particular in the line for feeding olefin(s) to the reactor.

The fresh olefin(s) liquid feed may be introduced directly into the liquid phase. It may also be introduced into the liquid phase for example by addition to any other liquid introduced into the reactor, especially to a liquid obtained by cooling and condensing condensable gas escaping from the vapor space of the reactor and returned into the reactor. The fresh olefin(s) liquid feed may also be introduced into the vapor space as liquid hydrocarbon spray. It is also possible advantageously to introduce a portion of the fresh olefin(s) liquid feed into the liquid phase and another portion into the vapor space. The introduction of the fresh olefin(s) liquid feed into the vapor space may take place at the side or through the top of the reactor.

FIG. 5 shows diagrammatically a solution polymerization device with a reactor (1) which comprises essentially a cylindrical part (2). The reactor is equipped with a fresh olefin(s) liquid feed conduit (3) which leads into the cylindrical part (2). The feed conduit (3) is fitted with a pump (8) and, at the pump delivery, with a heat exchanger (9) intended to cool the fresh olefin(s) liquid feed to the desired temperature. The feed conduit (3) is also fitted with a device for controlling the temperature of the fresh olefin(s) liquid feed, which comprises, at the exit of the heat exchanger (9), a stopcock (10) and a conduit (11) fitted with a stopcock (12) as a bypass of the heat exchanger (9) and of the stopcock (10) in order to bypass the said exchanger at will and to control accurately the temperature of the fresh olefin(s) liquid feed. The reactor is also equipped with a conduit (4) for withdrawing the liquid phase containing the manufactured polymer, a catalyst feed conduit (5) and an exit conduit (6) for a condensable gas which may be cooled, condensed and recycled in liquid form into the reactor. A conduit for introducing cocatalyst (7) leads into the fresh olefin(s) liquid feed conduit (3).

In a third embodiment, the present invention relates to a process for the polymerization of olefin(s), for example $C_4$ olefin(s), carried out in solution, in the presence of a cationic catalyst, in a reactor containing a liquid phase comprising a boiling liquid hydrocarbon polymerization medium and a vapor space above said liquid phase, characterized in that the polymerization is carried out in the presence of a chemical foam-suppressor.

According to one particular aspect, the invention also relates to a process for narrowing down the molecular weight distribution of a polyolefin obtained by the polymerization of olefin(s), especially $C_4$ olefin(s), preferably continuously, carried out in solution, in a reactor containing a liquid phase comprisingly a boiling liquid hydrocarbon polymerization medium and a vapor space above said liquid phase, in the presence of a cationic catalyst, characterized in that the polymerization is carried out in the presence of a chemical foam-suppressor which is introduced into the reactor, preferably continuously, when a continuous polymerization is carried out.

According to one aspect of the invention, the polymerization reaction is carried out in the presence of a chemical foam-suppressor. Any foaming phenomenon in the liquid phase can thus be avoided or stopped. What is more, it is then possible to conduct such a solution polymerization in stable conditions and to manufacture a polyolefin of uniform, and even improved, quality, which has in particular a narrow molecular weight distribution.

The chemical foam-suppressor may be a chemical foam-suppressor known as such. It may be a polyoxyalkylene glycol, also called polyether, obtained by (co) polymerization of one or more epoxides e.g. ethylene oxide, propylene oxide or butene oxide and having, for example, a weight-average molecular weight of ranging from 800 to 5 000 dalton. The polyoxyalkylene glycol may be a polyoxyethylene glycol or preferably a polyoxypropylene glycol. A block polyoxyalkylene glycol which comprises at least two blocks of different epoxides is advantageously employed. This block polyoxyalkylene glycol may comprise a block based on ethylene oxide units and a block based on propylene oxide units. It may, in particular, contain from 1 to 40% of units derived from ethylene oxide and from 60 to 99% of units derived from propylene oxide. The polyoxyalkylene glycol may be optionally fluorinated or perfluorinated. It may be a polyoxyalkylene glycol sold by B.P. Chemicals Ltd (U.K.) under the trade name Breox® or by BASF under the trade name Pluronic®.

The best results are obtained when the chemical foam-suppressor is a silicone and more particularly a polysiloxane.

Silicone is generally intended to mean compounds corresponding to the general formula

in which R and R', which are identical or different, denote alkyl radicals, for example from $C_1$ to $C_{12}$, especially from $C_1$ to $C_6$, aryl radicals, for example from $C_6$ to $C_{10}$, or aralkyl radicals, for example from $C_7$ to $C_{14}$. Polysiloxane is generally intended to mean polymers which have a monomer unit corresponding to the general formula

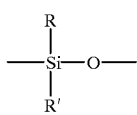

in which R and R' are defined as above. It is preferred to employ a polysiloxane such as a diphenylpolysiloxane or a dimethylpolysiloxane. Very advantageously the silicone and, in particular, the polysiloxane may have a kinetic viscosity at 25° C. ranging from 5 to 1 000 000 centiStokes (cSt), preferably from 5 000 to 7 000 000 cSt, and more particularly from 6 000 to 30 000 cSt.

By way of example, it is possible to employ a polysiloxane sold by General Electric Silicone (U.S.A.) in particular under the trade name "Viscasil"®, "SF 96"® or "SF 97"®. It is also possible to employ a polysiloxane sold by Wacker in particular under the trade name "SRE"® or by Union Carbide (U.S.A.) under the trade name "SAG"®.

The concentration of chemical foam-suppressor in the liquid phase of the reactor may range from 0.01 to 100, preferably from 0.1 to 10 parts by weight per million (ppm) in relation to the liquid phase.

The chemical foam-suppressor may be used as it is or in the form of a solution. The solution may be in a liquid hydrocarbon in a concentration which may range from 2 to 50% by weight. This liquid may be a liquid hydrocarbon or a mixture of liquid hydrocarbons containing, for example, from 3 to 25 carbon atoms. The liquid hydrocarbon may be at least one reactive hydrocarbon e.g. one or more olefins such as a butene or isobutene. The hydrocarbon may also be at least one inert hydrocarbon e.g. a linear, branched or cyclic alkane which may have from 3 to 12, preferably from 4 to 6, carbon atoms, e.g. a butane, a pentane, a hexane or cyclohexane. The liquid hydrocarbon may be at least one light polymer, in particular an oligomer, or a mixture of light polymers, for example of butene or of isobutene, which may originate from the polymerization reaction itself, optionally after they have been separated off by distillation, and which may have a number-average molecular weight, $M_n$, ranging from 100 to 300 dalton. The liquid hydrocarbon may be in particular a fresh olefin(s) liquid feed to the reactor, or the liquid phase comprising the liquid hydrocarbon polymerization medium itself, especially when a portion of the liquid phase is withdrawn from the reactor and reintroduced into the latter for the purpose of providing sufficient agitation of the liquid phase, or else a liquid obtained by cooling and condensation of condensable gas escaping through the vapor space of the reactor and returned into the reactor.

The chemical foam-suppressor may be introduced preferably continuously into the reactor, during a continuous polymerization process. Its introduction can take place at one or more points of the reactor. It may take place directly with the aid of a conduit which leads sideways into the reactor or through the bottom or else through the top of the polymerization reactor. It may take place indirectly by introducing the chemical foam-suppressor into a reactor feed conduit, especially into the fresh olefin(s) liquid feed conduit.

The chemical foam-suppressor may be introduced into the reactor directly into the liquid phase and/or into the vapor space above said liquid phase, for example by spraying.

The chemical foam-suppressor may be introduced at a temperature which is preferably lower than that of the liquid phase, especially in order to avoid a premature evaporation of the liquid employed to form the solution of the chemical foam-suppressor. It may thus be introduced at a temperature which is from 2 to 30° C., preferably from 3 to 15° C. lower than that of the liquid phase of the reactor. In some cases it may also be introduced at a temperature which is higher than that of the liquid phase, but on condition that an evaporation such as that mentioned above is avoided.

The chemical foam-suppressor may be introduced into the reactor in the form of a mixture with the catalyst and/or the cocatalyst.

The polymerization is advantageously carried out continuously. In this case the fresh olefin(s) liquid feed, the chemical foam-suppressor and the catalyst and optionally the cocatalyst are introduced into the reactor continuously. Furthermore, the liquid phase containing the manufactured polymer is itself withdrawn continuously from the reactor, it being possible for a portion of said liquid phase to be continuously returned into the reactor to maintain agitation in the liquid phase, and it being possible for the chemical foam-suppressor to be preferably continuously added to this portion which is continuously returned into the reactor. Similarly, at least a portion of a condensable gas escaping from the vapor space of the reactor may leave the reactor and be returned, preferably continuously, into the reactor after cooling and condensation in the form of a liquid. The chemical foam-suppressor and optionally the fresh olefin(s) liquid feed may be preferably continuously added to this liquid which is returned into the reactor. The polymerization is preferably carried out with agitation, for example with mechanical stirring or with agitation created by forced recirculation of a portion of the liquid phase withdrawn from the reactor and reintroduced, for example, with the aid of a pump. The chemical foam-suppressor may also be added to this forced liquid recirculation.

FIG. 6 shows diagrammatically a device for the solution polymerization of olefin(s), including a reactor (1) comprising essentially of a cylindrical part (2). The reactor (1) is equipped with a fresh olefin(s) liquid feed conduit (3) which leads into the cylindrical part (2). The fresh olefin(s) liquid feed conduit (3) is equipped with a cocatalyst feed conduit (4) and a chemical foam-suppressor feed conduit (5). The reactor is also equipped with a conduit for withdrawing the liquid phase comprising polymer (6), a catalyst feed conduit (7) and an exit conduit (8) for condensable gas, which may be cooled, condensed and recycled in liquid form into the reactor.

Method of measuring the breadth of the molecular weight distribution of a polybutene or polyisobutene In the present invention the breadth of the molecular weight distribution of the polybutenes or polyisobutenes is calculated as the ratio of the weight-average molecular weight, $M_w$, to the number-average molecular weight, $M_n$, from a curve obtained using a Waters® G.P.C. apparatus equipped with a refractometer detector. The apparatus includes a Waters 717 Plus® automatic injection system, a Waters 610® pump and a set of 4 Waters Ultrastyragel® columns of 10 000, 1 000, 500 and 100 porosity, 25 cm in length, which are mounted in series. The operating conditions are the following:

solvent: tetrahydrofuran (T.H.F.)

flow rate: 1 ml per minute temperature 35° C.

concentration of the sample analysed: 4% by weight injection volume: 40 µl calibration using polybutenes sold by BP Chemicals S.N.C. (France), which are chosen as a function of the polybutene or polyisobutene to be analysed. The number-average molecular weights $M_n$, of the standards employed are in most cases between 500 and 5 500 dalton.

EXAMPLES

Example 1

A device for continuous solution polymerization as shown diagrammatically in FIG. 2 is employed, including a reactor (1) comprising a cylindrical part (2). The spraying system (6) includes 6 "SC10N"® nozzles sold by Bete Fog Nozzle Inc. (USA) which end in a fine-spraying orifice which has a 9.9 mm diameter and which point vertically towards the bottom of the reactor. The spraying system is situated 2 m above the surface of the liquid phase separating the vapor space from said liquid phase of the reactor.

This reactor is fed continuously with fresh olefin(s) through the conduit (3) using a liquid feed containing, by weight, 29% of 1-butene, 8% of cis 2-butene, 11% of trans 2-butene, 44% of isobutene and 8% of butanes. The total flow rate of the fresh olefin(s) liquid feed via the conduit (3) is 38 m$^3$/h.

With the valve (5) being open, the liquid hydrocarbon spray consisting of a portion of the fresh olefin(s) liquid feed is introduced continuously into the vapor space of the reactor through the conduit (4) at a flow rate of 10 m$^3$/h in the form of droplets which have a mean diameter of 1 000 µm, while the remainder of the fresh olefin(s) liquid feed is introduced continuously directly into the liquid phase of the reactor at a flow rate of 28 m$^3$/h.

The reaction temperature is +10° C., the total absolute pressure in the reactor is 0.15 MPa. The catalyst system includes tert-butyl chloride as cocatalyst and ethyldichloro-aluminium as catalyst in a molar ratio of 4.1:1 respectively. The cocatalyst is introduced continuously into the fresh olefin(s) liquid feed conduit (3) with the aid of the conduit (10a) at a flow rate of 8 kg/h, and the catalyst into the recycle conduit (12) with the aid of the conduit (8a).

In these conditions, after continuous withdrawal of the liquid phase and distillation of light polymers, 10 t/h are obtained in a stable manner of a polyisobutene which has a molecular weight, M$_n$, of 1 000 dalton, a molecular weight distribution breadth of 1.65 and a chlorine content of 25 ppm. Furthermore, no foaming phenomenon is observed in the reactor. The polymerization takes place in very stable conditions and the quality of the polymer manufactured is substantially uniform.

Example 2 (Comparative)

The operation is carried out exactly as in Example 1, with the exception that the valve (5) is closed and that therefore all of the fresh olefin(s) liquid feed is introduced directly into the liquid phase of the reactor at a flow rate of 38 m$^3$/h.

In these conditions a polymerization is carried out in relatively unstable conditions with, in particular, problems of loss of priming of a pump (not shown in FIG. 2) in the conduit for withdrawal (7) of the polymer. After withdrawal of the liquid phase and distillation of light polymers, 10 t/h are obtained of a polyisobutene which has a molecular weight distribution breadth of 1.85 and a chlorine content higher than 25 ppm. Furthermore, considerable foaming of the liquid phase is observed, which manifests itself in the presence of a foam that occupies the entire volume of the reactor and the relative density of which from the top towards the bottom of the reactor ranges from 0.1 to 0.5.

Example 3

A solution polymerization device as shown diagrammatically in FIG. 5 is employed, including a reactor (1) comprising of a cylindrical part (2).

This reactor is fed continuously with fresh olefin(s) through the conduit (3) using a fresh olefin(s) liquid feed containing, by weight, 29% of 1-butene, 8% of cis 2-butene, 11% of trans 2-butene, 44% of isobutene and 8% of butanes.

The fresh olefin(s) liquid feed is continuously cooled to +5° C. with the aid, in particular, of the heat exchanger (9). The fresh olefin(s) liquid feed rate is 38 m$^3$/h.

The temperature of the polymerization reaction, that is to say the temperature of the liquid phase, is +10° C. The total absolute pressure in the reactor is 0.15 MPa.

The catalyst system includes tert-butyl chloride as cocatalyst and ethyldichloroaluminium as catalyst in a molar ratio of 4.1:1 respectively. The cocatalyst is introduced into the fresh olefin(s) liquid feed conduit (3) with the aid of the conduit (7) at a flow rate of 8 kg/h. The catalyst is introduced into the reactor through the conduit (5).

In these conditions, after continuous withdrawal of the liquid phase and distillation of light polymers, 10 t/h of a polyisobutene are obtained which has a molecular weight, M$_n$, of 1 000 dalton, a molecular weight distribution breadth of 1.7 and a chlorine content of 25 ppm. Furthermore, extremely little foaming is observed in the reactor.

Example 4 (Comparative)

The operation is carried out exactly as in Example 3, except that the fresh olefin(s) liquid feed is not cooled. It is introduced into the reactor at ambient temperature (+20° C.).

A polymerization is thus carried out in relatively unstable conditions, in particular with problem, of loss of priming of a pump (not shown in FIG. 5) in the polymer withdrawal conduit (4).

After withdrawal of the liquid phase and distillation of light polymers, 10 t/h are obtained of a polyisobutene which has a molecular weight distribution breadth of 1.85 and a chlorine content higher than 25 ppm. Furthermore considerable foaming of the liquid phase is observed, which manifests itself in the presence of a foam which occupies the whole volume of the reactor and the relative density of which from the top towards the bottom of the reactor ranges from 0.1 to 0.5.

Example 5

A solution polymerization reactor such as that shown diagrammatically in FIG. 6, comprising of a cylindrical part (2), is employed.

This reactor is fed through the conduit (3) with a fresh olefin(s) liquid feed containing, by weight, 29% of 1-butene, 8% of cis 2-butene, 11% of trans 2-butene, 44% of isobutene and 8% of butanes. The fresh olefin liquid feed rate is 38 m$^3$/h.

The chemical foam-suppressor "Viscasil 12 M"®, which has a kinematic viscosity at 25° C. of 12 500 cSt, is introduced into the reactor through the conduit (5) at a flow rate of 110 g/h.

The reaction temperature is +10° C., the total absolute pressure in the reactor is 0.15 MPa. The catalyst system includes tert-butyl chloride as cocatalyst and ethyldichloroaluminium as catalyst in a molar ratio of 4.1:1 respectively. The cocatalyst is introduced into the reactor through the conduit (4) at a flow rate of 8 kg/h and the catalyst is introduced through the conduit (7).

In these conditions, after distillation, 10 t/h are obtained of a polyisobutene which has a molecular weight, M$_n$, of 1 000 dalton, a molecular weight distribution breadth of 1.65 and a chlorine content of 25 ppm. Furthermore, no foaming phenomenon is observed and the polymerization takes place in stable conditions.

Example 6 (Comparative)

The operation is carried out exactly as in Example 5, except for the fact that no chemical foam-suppressor is introduced.

In these conditions a polymerization is carried out in unstable conditions, especially with problems of loss of priming of a pump (not shown in FIG. 6) in the polymer withdrawal conduit (6).

After distillation, 10 t/h are obtained of a polybutene which has a molecular weight distribution breadth of 1.85 and a chlorine content higher than 25 ppm. Furthermore, considerable foaming of the liquid phase is observed, which is reflected the presence of a foam which occupies the whole volume of the reactor, the relative density of which from the top towards the bottom of the reactor ranges from 0.1 to 0.5.

We claim:

1. A process for producing an olefin polymer of a low polydispersity index having low catalyst residues and/or low chlorine content which comprises polymerizing olefin(s) in solution, in the presence of a cationic catalyst, in a reactor containing a liquid phase comprising a liquid boiling hydrocarbon polymerization medium and having a vapor space above said liquid phase, said polymerizing being carried out in the presence of a non-mechanical agent capable of suppressing foam formation during said polymerization.

2. A process for reducing a polydispersity index of an olefin polymer having low catalyst residues and/or low chlorine content which comprises solution polymerizing olefin(s) in the presence of a cationic catalyst in a reactor containing a liquid phase comprising a liquid boiling hydrocarbon polymerization medium and having a vapor space above said liquid phase, said solution polymerizing being carried out in the presence of a non-mechanical agent capable of suppressing foam formation during said polymerization.

3. A process according to claim 1, wherein the agent capable of suppressing foam formation is a liquid hydrocarbon spray introduced into the vapor space above the liquid phase in the reactor.

4. A process according to claim 3, wherein the liquid hydrocarbon spray is introduced into the vapor space at a height of at least 1 m above the surface of the liquid phase separating said vapor space from said liquid phase.

5. A process according to claim 3, wherein the liquid hydrocarbon spray is introduced into the vapor space at a temperature lower than that of the liquid phase in the reactor.

6. A process according to claim 3, wherein the liquid hydrocarbon spray consists of a portion or of all of the fresh olefin(s) liquid feed to the reactor.

7. A process according to claim 3, wherein the liquid hydrocarbon spray consists of all or of a portion of a liquid obtained after cooling and condensation of a condensable gas escaping from the vapor space of the reactor.

8. A process according to claim 3, wherein the liquid hydrocarbon spray consists of a portion of the liquid phase withdrawn from the reactor.

9. A process according to claim 3, wherein the polymerization of olefin(s) is carried out continuously and the liquid hydrocarbon spray is continuously introduced into the vapor space of the reactor.

10. A process according to claim 1, wherein the agent capable of suppressing foam formation is a fresh olefin liquid feed introduced into the reactor at a temperature lower than that of the liquid phase.

11. A process according to claim 10, wherein the temperature of the fresh olefin liquid feed is from 2 to 30° C. lower than that of the liquid phase in the reactor.

12. A process according to claim 10, wherein the fresh olefin liquid feed is introduced into the liquid phase of the reactor.

13. A process according to claim 10, wherein the fresh olefin liquid feed is introduced into the vapor space of the reactor.

14. A process according to claim 10, wherein the polymerization of olefin(s) is carried out continuously and the fresh olefin liquid feed is continuously introduced into the reactor.

15. A process according to claim 1, wherein the agent capable of suppressing foam formation is a chemical foam-suppressor.

16. A process according to claim 15, wherein the chemical foam-suppressor is selected from the group consisting of polyoxyalkylene glycol and silicone.

17. A process according to claim 16, wherein the silicone has a kinematic viscosity at 25° C. ranging from 5 to 1 000 000 centiStokes.

18. A process according to claim 16, wherein the polyoxyalkylene glycol is a block polyoxyalkylene glycol comprising a block based on ethylene oxide units and a block based on propylene oxide units.

19. A process according to claim 16, wherein the chemical foam-suppressor is present in the liquid phase of the reactor at a concentration of 0.01 to 100 parts by weight per million in relation to the liquid phase.

20. A process according to claim 16, wherein the polymerization of olefin(s) is carried out continuously and the chemical foam-suppressor is continuously introduced into the reactor.

21. A process according to claim 1, wherein the olefin used in the polymerization is at least one $C_4$ olefin.

22. A process according to claim 21, wherein said olefin used in the polymerization is isobutene.

* * * * *